United States Patent
Brosh et al.

[11] Patent Number: 5,962,929
[45] Date of Patent: Oct. 5, 1999

[54] FAULT TOLERANT POWER DISTRIBUTION

[75] Inventors: Richard M. Brosh; Scott C. Willis, both of Manassas, Va.

[73] Assignee: Lockheed Martin Corporation, Bethesda, Md.

[21] Appl. No.: 09/064,101

[22] Filed: Apr. 22, 1998

[51] Int. Cl.⁶ ........................................... G01R 31/00
[52] U.S. Cl. .................... 307/36; 307/38; 307/130; 315/122; 315/185 R; 315/225
[58] Field of Search ........................... 307/36, 116, 130, 307/38; 315/121, 122, 185 R, 185 S, 225; 324/556

[56] References Cited

U.S. PATENT DOCUMENTS

| | | | |
|---|---|---|---|
| 3,535,585 | 10/1970 | Barnum | 307/36 |
| 3,639,805 | 2/1972 | Muench et al. | 315/122 |
| 4,682,079 | 7/1987 | Sanders et al. | 315/185 S |
| 4,772,806 | 9/1988 | Lean et al. | 307/36 |
| 4,912,372 | 3/1990 | Mongoven et al. | 315/122 |
| 5,319,312 | 6/1994 | Segilia | 324/556 |
| 5,453,664 | 9/1995 | Harris | 315/225 |

*Primary Examiner*—Albert W. Paladini
*Attorney, Agent, or Firm*—Lane, Aitken & McCann

[57] ABSTRACT

A power distribution system in which the loads are connected in series to a current source. At each load, a current source to voltage source convertor provides alternative current paths. A serial power distribution current path includes a modulated switch (e.g. a pulse width modulated switch) to control the amount of power delivered to the load via a load current path. The load current path includes a diode which couples a capacitor across the switch, providing a semi-regulated voltage input to a d.c. to d.c. convertor connected across the capacitor. The d.c. to d.c. convertor provides a regulated output voltage, which is connected to the load. The control circuit for modulating the opening and closing of the switch is connected in parallel across the capacitor.

9 Claims, 1 Drawing Sheet

FAULT TOLERANT POWER DISTRIBUTION

BACKGROUND OF THE INVENTION

1. Field of the Invention

This invention relates to power distribution systems, and more particularly to a system for distributing power to a number of remote, inaccessible loads.

2. Description of the Prior Art

With multiple loads connected to a common power distribution system, failure of any single load (open circuit or short circuit) should not disrupt power to the remaining loads. While there are a number of prior art power distribution systems with load fault isolation, there is no entirely satisfactory system for certain applications where the loads are connected in series.

SUMMARY OF THE INVENTION

An object of this invention is the provision of a power distribution system in which any one or more of a plurality of series connected loads is automatically isolated in response to an open circuit or short circuit fault without disruption of power to the remaining loads connected to the system.

Another object of the invention is the provision of a power distribution system which allows an apparently failed load to be reconnected to the system without physical access to the load.

Briefly, this invention contemplates the provision of a power distribution system in which the loads are connected in series to a current source. At each load, a current source to voltage source convertor provides alternative current paths. A serial power distribution current path includes a modulated switch (e.g. a pulse width modulated switch) to control the amount of power delivered to the load via a load current path. The load current path includes a diode which couples a capacitor across the switch, providing a semi-regulated voltage input to a d.c. to d.c. convertor connected across the capacitor. The d.c. to d.c convertor provides a regulated output voltage, which is connected to the load. The control circit for modulating the opening and closing of the switch is connected in parallel across the capacitor.

An overvoltage resonsive circit is connected across the switch to bypass the unit in an open circuit load condition. In the event of a short circuit associated with the load, current passes through the failed unit, allowing downstream, series connected loads to continue to receive power. In the event of an open circuit fault associated with the load, the voltage across the switch rises. The over voltage voltage responsive circuit comprises a voltage detector and an SCR connected across the switch. The detector triggers the SCR in response to the rise in voltage across the switch, by passing the failed unit and again allowing power to pass to the remaining downstream, series connected units.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT

Figure 1:
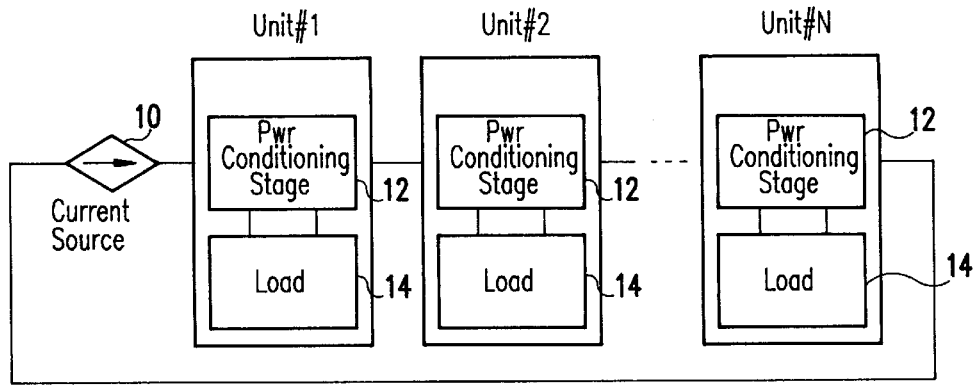
FIG. 1 is a schematic block diagram illustrating a fault tolerant power distribution system in accordance with the teachings of this invention.

Referring now to FIG. 1, a power distribution system in accordance with the teachings of this invention includes a plurality of units, #1 through #N connected in series to a d.c. power supply 10 functioning as a current source to the series connected units. Here it will be appreciated, a power supply functions as a current source when its resistance is high relative to the resistance of the connected loads; that is, the addition or deletion of one or more series connected units will not change appreciably the overall reistance of the series connected loop, which includes the power supply 10, and will therefore not change appreciably the current output of supply 10. Each unit (i.e. #1 through #N) has a power conditioning stage 12 and a connected load 14.

Figure 2:
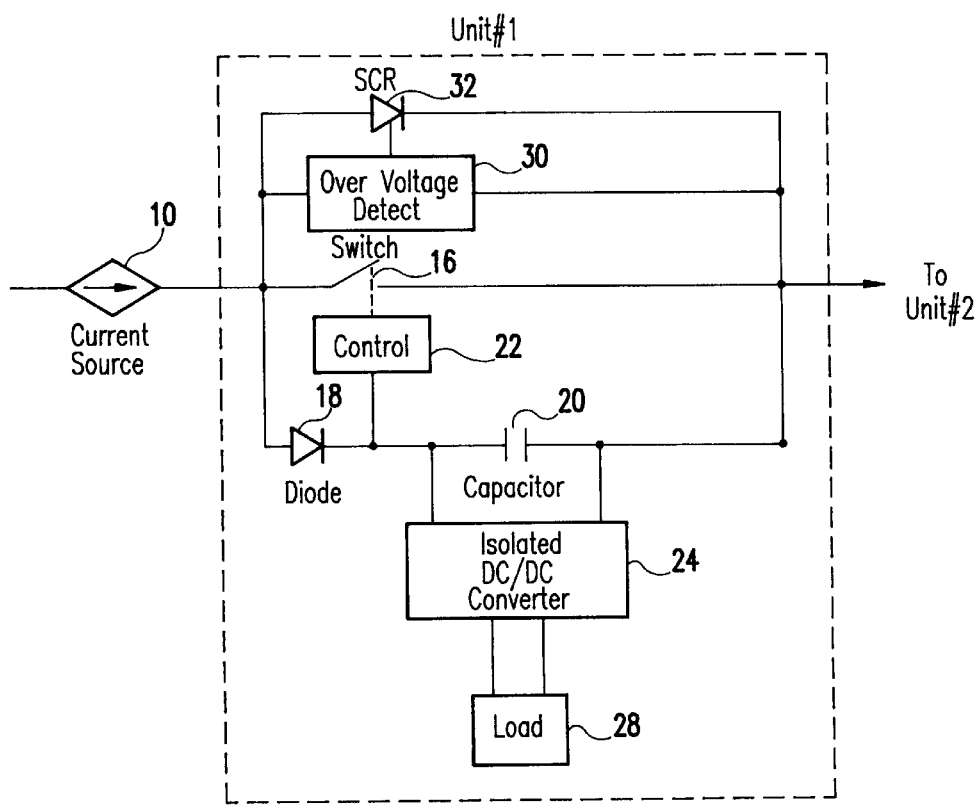
FIG. 2 is more detailed schematic and block diagram of one of the series connected units shown in FIG. 1.

Referring now to FIG. 2, the power conditioning stage of each unit includes a switch 16, such as a MOSFET switch, for example. A diode 18 connects a capacitor 20 across the switch 16 and the capacitor, in the absence of a fault conditon, clamps the voltage across the switch at a level determined by a controller 22. The control input to controller 22 (e.g a pulse width modulating controller) is connected across the capacitor 20 and controls the opening and closing of the switch 16 to the end that the voltage across the capacitor 20 is held roughly at a predetermined value. With this roughly regulated input voltage, any one of a number of suitable, inexpensive, commercially available d.c. to d.c. convertors 24 can provide a regulated voltage input to the connected load 28.

An over voltage detector 30 is connected across the switch 16. The over voltage detector 30 compares the voltage across the switch to a reference. If the voltage across the switch exceeds the reference voltage, an output from the detector 30 triggers conduction of an SCR 32, which acts as a semiconductor switch providing a low resistance path for the current source 10 around the switch 16.

In operation, the controler 22, switch 16, diode 18 and capacitor 20 provide a roughly regulated voltage input to the d.c. to d.c. convertor 24. The output of the convertor 24 is a regulated voltage, which is coupled to the load 28. In the event of a short circuit in the load 28, the voltage across the capacitor 20 will decrease, and the controller 22 will maintain the switch in a closed condition in response to this low voltage condition. Thus, the switch 16 provides a low resistance path for power to units downstream of the unit with a short circuit fault. In the event of an open circuit load fault, the voltage across the capacitor 20 will increase. In response to this over voltage condition, the voltage dector 30 will trigger SCR 32, providing a low resistance path for power to units downstream of the unit with an open circuit fault.

While the invention has been described in terms of a single preferred embodiment, those skilled in the art will recognize that the invention can be practiced with modification within the spirit and scope of the appended claims.

Having thus described out invention, what we claim as new and desire to secure by Letters Patent is as follows:

1. A power distribution system comprising in combination:

a constant current power source for said power distribution system;

a plurality of load units connected respectively in series with each other and in series with said constant current power source with each unit having an input and an output;

means connecting the output of one load unit to the input of the next load unit in the series;

each of said load units including:
- a switch connecting its input to its output and a capacitor coupled by a diode in series with said capacitor across said switch;
- a controller responsive to the voltage across said capacitor to control the opening and closing of said switch to maintain the voltage across said capacitor roughly at a predetermined value;
- a d.c. to d.c. convertor connected across said capacitor, and a load connected to said d.c. to d.c. convertor;
- an over voltage detector connected across said switch; and
- an over voltage switch connected to an output of said over voltage detector so that said over voltage switch is triggered to its conducting state in response to an over voltage condition across said switch.

2. A power distribution system comprising in combination:
- a constant current power source for said power distribution system;
- a plurality of load units connected respectively in series with each other forming a series of load units, each of said load units having an input and an output with the first load unit of said series of load units connected to said constant current power source;

each of said load units including;
- a current source to voltage source convertor;
- a load connected in parallel with and powered by said current source to voltage source convertor;
- an over voltage detection circuit connected to detect an over voltage across said load; and
- a low impedance bypass circuit responsive to said over voltage detection circuit to connect the input of said unit to the output of said unit in response to an over voltage condition across said load that is detected by said over voltage detection circuit.

3. A power distribution system as in claim 1 wherein said low impedance by pass circuit includes a silicone control rectifier.

4. A power distribution system as in claim 2 wherein said current source to voltage source convertor is a modulating switch connecting the input of said module to the output of said module.

5. A power distribution system as in claim 4 wherein said modulating switch is a pulse width modulated switch whose duty cycle is controlled to maintain a predetermined voltage across said load.

6. A power distribution system as in claim 4 wherein said current source to voltage source convertor further includes a diode and a capacitor connected in series between the input of said module and the output of said module and said load is connected across said capacitor.

7. A power distribution system as in claim 5 wherein said current source to voltage source convertor further includes a diode and a capacitor connected in series between the input of said module and the output of said module and said load is connected across said capacitor.

8. A power distribution system as in claim 6 further including a dc to dc convertor connected between said capacitor and said load.

9. A power distribution system as in claim 7 further including a dc to dc convertor connected between said capacitor and said load.

* * * * *